(12) United States Patent
Bayle et al.

(10) Patent No.: US 7,214,720 B2
(45) Date of Patent: May 8, 2007

(54) PRODUCTION OF LIQUID FUELS BY A CONCATENATION OF PROCESSES FOR TREATMENT OF A HYDROCARBON FEEDSTOCK

(75) Inventors: Jérôme Bayle, Orvault (FR); Guillaume Boissonnet, Grenoble (FR); Eric Marty, Pierre Benite (FR); Jean-Marie Seiller, Seyssins (FR)

(73) Assignees: Institut Francais du Petrole, Rueil Malmaison Cedex (FR); Commissariat a l'Energie Atomic, Paris Cedex (FR)

( * ) Notice: Subject to any disclaimer, the term of this patent is extended or adjusted under 35 U.S.C. 154(b) by 28 days.

(21) Appl. No.: 10/971,711

(22) Filed: Oct. 25, 2004

(65) Prior Publication Data

US 2005/0250862 A1    Nov. 10, 2005

(30) Foreign Application Priority Data

Oct. 24, 2003  (FR)  .................................. 03 12551

(51) Int. Cl.
*C07C 27/00* (2006.01)
*C10G 11/00* (2006.01)
(52) U.S. Cl. ...................... 518/700; 518/702; 518/703; 518/705; 208/102

(58) Field of Classification Search ................ 518/700, 518/702, 703, 705; 208/102
See application file for complete search history.

(56) References Cited

U.S. PATENT DOCUMENTS 6,566,411 B2 *   5/2003   Moore et al. ................ 518/700
2003/0192235 A1  10/2003  French et al.

FOREIGN PATENT DOCUMENTS

WO    WO 01/66496    9/2001

* cited by examiner

*Primary Examiner*—J. Parsa
(74) *Attorney, Agent, or Firm*—Millen, White, Zelano & Branigan, P.C.

(57) ABSTRACT

The invention relates to an installation and a process for the production of liquid fuels starting from a solid feedstock that contains the organic material in which:
 a) the solid feedstock is subjected to a gasification stage so as to convert said feedstock into synthesis gas,
 b) the synthesis gas is subjected to a purification treatment,
 c) the purified synthesis gas is subjected to a conversion stage that comprises the implementation of a Fischer-Tropsch-type synthesis so as to convert said synthesis gas into a liquid effluent and a gaseous effluent,
 d) the liquid effluent is fractionated so as to obtain a gaseous fraction, a naphtha fraction, a kerosene fraction and a gas oil fraction, and
 e) at least a portion of the naphtha fraction is recycled in gasification stage a).

20 Claims, 1 Drawing Sheet

PRODUCTION OF LIQUID FUELS BY A CONCATENATION OF PROCESSES FOR TREATMENT OF A HYDROCARBON FEEDSTOCK

FIELD OF THE INVENTION

This invention relates to a process for the production of liquid fuels starting from a solid feedstock that comprises organic material, typically biomass. More particularly, the invention relates to a process that comprises a gasification stage of the solid feedstock, a stage for purification of the synthesis gas, and a stage for transformation of the synthesis gas into liquid fuels.

PRIOR ART

A large number of patents describe the use of synthesis gas for producing biofuels by a Fischer-Tropsch synthesis with which hydrocracking is often combined. The Fischer-Tropsch synthesis produces gas oil fractions, kerosene fractions, naphtha fractions and a top gas in a more or less significant amount based on the set of operating conditions selected from the Fischer-Tropsch and hydrocracking reaction zones, as well as operating conditions of the downstream distillation train.

U.S. Pat. No. 5,494,653 proposes a method for treatment of a synthesis gas by contact with an alumina-based catalyst and a gaseous mixture that comprises water vapor and hydrocarbons, at a temperature of between 530° C. and 980° C., in which the hydrocarbons are cracked to form hydrogen, carbon monoxide and/or carbon dioxide and in which the hydrogen content increases at the same time that the carbon monoxide content decreases.

An object of this invention is to maximize the conversion of the carbon of the feedstock into heavy liquid fuels such as gas oil and/or kerosene. It is thus sought to reduce or to upgrade the naphtha that is produced by this type of process, whereby the latter exhibits only a limited economic advantage. Various upgrading methods can be considered for the naphtha that is produced.

Patent Application WO 02/55633 considers a method in which the light olefins that are contained in the naphtha undergo a dimerization to be converted into heavier fractions, whereby the proportion of olefins contained in the naphtha optionally can be increased by a dehydrogenation stage of the naphtha fraction.

Patent Application WO 01/64610 envisages the use of the naphtha fraction for producing alkyl benzenes that have excellent lubricating properties. The naphtha is converted into aromatic compounds by catalytic reforming. The $C_{18}$–$C_{28}$ fraction that is produced by Fischer-Tropsch is dehydrogenated then reacted with the aromatic compounds in an alkylation unit.

Patent Application WO 01/60773 describes a process for converting light hydrocarbons into heavier hydrocarbons that use Fischer-Tropsch-type reactions starting from a natural gas feedstock. In this process, the natural gas is converted with the water vapor in a pre-reforming stage. This patent also describes the possibility of recycling light hydrocarbons and optionally gaseous effluents of the Fischer-Tropsch synthesis in the pre-reforming zone upstream from the zone of said Fischer-Tropsch synthesis. Because of the nature of the feedstock, in this case natural gas, the molar ratio of hydrogen to carbon monoxide, $H_2/CO$, at the outlet of the initial pre-reforming zone is generally greater than 2 and should be adjusted by reducing the injection of water vapor.

In the case of the invention, the hydrocarbon feedstock is a solid feedstock such as biomass. This type of feedstock is generally, relative to the natural gas, more oxygen-depleted. As a result, the $H_2/CO$ molar ratio at the outlet of the gasification stage has the tendency of being less than 2, regardless of the amount of water vapor injected.

DETAILED DESCRIPTION OF THE INVENTION

One object of this invention is to maximize the conversion of the carbon of the feedstock into heavy liquid fuels such as gas oil and/or kerosene, while limiting the reduction of the $H_2/CO$ molar ratio in the gasification stage. It generally is necessary to offset this reduction of the $H_2/CO$ molar ratio by an adjustment that is carried out by a conversion reaction of the carbon monoxide (shift reaction according to English terminology), which consists in oxidizing the carbon monoxide by water so as to produce hydrogen and carbon dioxide. This adjustment generally induces a significant loss of CO mass flow rate that then directly affects the production of biofuels because the latter is directly proportional to the mass flow rate of carbon monoxide at the inlet of the Fischer-Tropsch-type synthesis stage.

A process was found for the production of liquid fuels starting from a solid feedstock that contains the organic material in which:

a) The solid feedstock is subjected to a gasification stage so as to convert said feedstock into synthesis gas comprising carbon monoxide and hydrogen, b) the synthesis gas that is obtained in stage a) is subjected to a purification treatment that comprises an adjustment for increasing the molar ratio of hydrogen to carbon monoxide, H2/CO, up to a predetermined value, preferably between 1.8 and 2.2, c) the purified synthesis gas that is obtained in stage b) is subjected to a conversion stage that comprises the implementation of a Fischer-Tropsch-type synthesis so as to convert said synthesis gas into a liquid effluent and a gaseous effluent, d) the liquid effluent that is obtained in stage c) is fractionated so as to obtain at least two fractions that are selected from the group that consists of: a gaseous fraction, a naphtha fraction, a kerosene fraction, and a gas oil fraction, and e) at least a portion of the naphtha fraction is recycled in gasification stage a).

Another object of the invention is to maximize the conversion of tars and light hydrocarbons during the gasification stage. Actually, a biomass-type feedstock may produce, during the gasification stage, the formation of a substantial amount of methane that it is suitable to convert.

It thus was found that, despite the need to limit the reduction of the $H_2/CO$ molar ratio during the gasification stage a), rigorous conditions advantageously can be used during the gasification stage.

Gasification stage a) is thus preferably used in at least one zone in which the temperature is kept above 1000° C.

More preferably, during gasification stage a):

the feedstock is brought into contact with an oxidizing agent under pyrolysis conditions to produce a first gaseous effluent in a primary zone in which the solid feedstock is kept in the fluidized state and the content of the oxidizing gas is kept below 10 mol %, preferably below 5 mol %, and the gaseous effluent that is thus produced is subjected to a finishing treatment in a secondary zone in which the temperature is kept between 1000 and 1500° C.

The input of energy into the primary zone preferably can be carried out by a solid heat exchanger that is brought to a temperature that is generally between 600 and 1000° C. This solid heat exchanger can correspond, in a non-exhaustive manner, to a natural mineral or a mixture of natural minerals, optionally shaped, such as dolomite, mica, olivine, bentonite, trona, borax, or other derivatives, or to an inert-type substrate (sand, silica) or an active-type substrate (alumina, dolomite, olivine, carbon) that can contain metal elements (Ni, Cu, Fe, Zn or others) or by compounds that contain alkaline or alkaline-earth salts.

The solid heat exchanger may preferably comprise a silica alumina that has an acidic nature, such as those used in the fluidized-bed cracking processes (FCC) for conversion of the heavy residues that are obtained from the distillation of the petroleum.

The feedstock can be introduced into the primary zone by any means known to one skilled in the art. For example, it can be introduced by means of a conveying gas that can be a nitrogen-type cover gas, a water vapor-type oxidizing agent or carbon dioxide or an oxygen-depleted gas, such as combustion fumes. Most of the gasification processes use a cover gas as a carrier of the solid feedstock, and it is therefore necessary to purge a significant fraction of the gaseous effluents of the Fischer-Tropsch synthesis, whereby this fraction is often greater than or equal to 10%, to prevent the accumulation of cover gas in the circuit.

According to another object of the invention, it is possible to optimize the purge fraction of the gaseous effluents of the Fischer-Tropsch synthesis. It is possible to attempt to, for example, limit the purge fraction to values of less than 5%.

The solid feedstock thus can preferably be injected by means of a fluid that does not contain nitrogen, for example carbon dioxide or superheated water vapor.

In stage b) of the invention, the synthesis gas that is obtained in stage a) is subjected to a purification treatment. This purification treatment of stage b) can also comprise at least one of the treatments that is selected from among a reduction of the water content, a reduction of the dust content, an extraction of carbon dioxide and a compression of the synthesis gas.

In stage c) of the invention, the purified synthesis gas obtained in stage b) is subjected to a conversion stage that comprises the implementation of a Fischer-Tropsch-type synthesis.

This stage c) can preferably also comprise a stage for filtering waxes produced by said Fischer-Tropsch-type synthesis, a stage for fractionation so as to recover a fraction of hydrocarbon compounds that have at least nineteen carbon atoms ($C_{19}^+$ fraction), and a stage for hydrocracking said compounds.

At least a portion of the gaseous effluent that is obtained in stage c) and of the gaseous fraction that is obtained with stage d) in gasification stage a) is preferably recycled.

It is also possible to purge a portion of the gaseous effluent obtained in stage c) and of the gaseous fraction that is obtained in stage d).

In stage e) of the invention, at least a portion of the naphtha fraction is recycled in gasification stage a).

According to an embodiment of the invention, at least a portion of the naphtha fraction is recycled in the primary zone of stage a).

According to another embodiment of the invention, at least a portion of the naphtha fraction is recycled in the secondary zone of stage a).

The invention also relates to an installation for the production of liquid fuels starting from a solid feedstock that contains organic material, whereby said installation comprises:
  means for gasification of the solid feedstock in synthesis gas,
  means for purification of synthesis gas, whereby said purification means comprise a means for adjustment of the molar ratio of hydrogen to carbon monoxide, H2/CO, of said synthesis gas,
  means for conversion of the purified synthesis gas into a liquid effluent, whereby said conversion means comprise at least one Fischer-Tropsch synthesis reactor,
  means for fractionation of the liquid effluent that make it possible to obtain a liquid fuel and a naphtha fraction, and
  means for recycling naphtha to the gasification means.

In a more detailed manner, the installation can comprise:
  means to supply the solid feedstock,
  means for gasification connected to supply means and equipped with a pipe for evacuation of a synthesis gas,
  means for purification connected to the pipe for evacuation of the synthesis gas and equipped with a pipe for evacuation of a purified synthesis gas, whereby said purification means comprise a means for adjustment of the molar ratio of hydrogen to carbon monoxide, H2/CO, of said synthesis gas,
  means for conversion connected to the pipe for evacuation of the purified synthesis gas and equipped with a pipe for evacuation of a liquid effluent, whereby said conversion means comprise at least one Fischer-Tropsch synthesis reactor,
  means for fractionation of the liquid effluent connected to the pipe for evacuation of the liquid effluent and equipped with at least one pipe for evacuation of liquid fuel and a pipe for evacuation of a naphtha fraction, and
  means for recycling placed between the pipe for evacuation of naphtha and the gasification means.

The process and the installation according to the invention thus propose an original and advantageous solution that makes possible a significant conversion of a solid feedstock that comprises organic material with a grain size that is typically between 0.1 and 100 mm (millimeter) into heavy fractions such as gas oil+kerosene.

The process of the invention makes possible, in particular,
  a significant conversion of the carbon of the initial feedstock into synthesis gas,
  a maximum production of liquid fuels such as gas oil and kerosene, and
  a significant operating flexibility that makes it possible to operate on the various flow rates of recycling and the possible make-up fuel in a secondary gasification zone so as to be able to best adjust the H2/CO ratio of the synthesis gas.

One advantage of the invention is therefore to maximize the conversion of the carbon of the feedstock into heavy liquid fuels such as gas oil and/or kerosene. It also makes it possible to reduce or to upgrade the naphtha that is produced by this type of process.

Another advantage of the invention is to limit the costly adjustments to increase the $H_2$/CO molar ratio during the stage for purification of the synthesis gas.

Another advantage of the invention is to maximize the conversion of tars and light hydrocarbons in the gasification stage while limiting the reduction of the $H_2/CO$ molar ratio that is induced by the secondary high-temperature stage.

Another advantage is the possibility of reducing the purge fraction of the gaseous effluents of the Fischer-Tropsch synthesis.

DESCRIPTION OF THE FIGURES

Other advantages, details and characteristics of the invention shall emerge more clearly in the description of the two embodiments illustrated in FIGS. 1 and 2. These embodiments are provided by way of example and do not exhibit any limiting nature. This illustration of the process of the invention does not comprise all the components that are necessary to its implementation. Only the elements that are necessary to the comprehension of the invention are shown there, whereby one skilled in the art can complete this representation to implement the invention.

In the embodiments that are shown in FIGS. 1 and 2, the process of the invention comprises the following separate zones:

Figure 1:
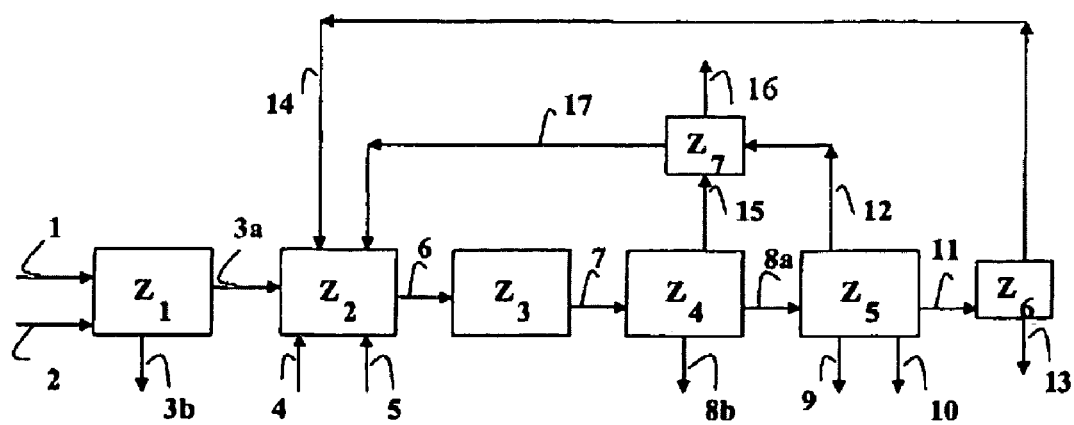

a primary zone Z1 for pyrolysis and gasification of the hydrocarbon feedstock, a secondary zone Z2 for gasification that operates under more rigorous conditions than in Z1, a zone Z3 for purification and treatment of synthesis gas, a zone Z4 for production of liquid fuels starting from gas for synthesis and transformation of these liquid fuels so as to adjust them to the final specifications of the desired products, a zone Z5 for separation of the liquid effluents into naphtha, kerosene, and gas oil, a zone Z6 for separation of the naphtha flow so as to purge all or part of the naphtha before recycling, a zone Z7 for separation of the top gas that is produced in section Z4 so as to purge all or part of the gas that is produced before recycling.

In the embodiments shown, stage a) of the process of the invention is therefore carried out in two separate zones Z1 and Z2.

A pyrolysis and a gasification of the hydrocarbon feedstock that is supplied by a pipe 1 are carried out in zone Z1. The feedstock comprises particles whose mean diameter can be between 0.1 and 100 mm, preferably between 1 and 10 mm. The pyrolysis and the gasification are carried out in the presence of an oxidizing agent, supplied by a pipe 2, such as water vapor, alone or mixed with another gas, such as carbon dioxide, carbon monoxide, hydrogen or methane. Without exceeding the scope of the invention, the reactive carrier gas can be carbon dioxide, alone or mixed with another gas such as water vapor, carbon monoxide, hydrogen or methane. In general, and so as to ultimately obtain a synthesis gas with a high calorific value, the oxidizing gas content, for example oxygen or air, is reduced as far as possible. The oxidizing gas content is advantageously less than 10 mol %, and even less than 5 mol %.

Section Z1 corresponds to a fluidized-bed process comprising one or more stages of pyrolysis and gasification as described by U.S. Pat. No. 5,494,653. Two types of effluents are produced: gaseous effluents represented by flow 3a and unconverted solid residues that are shown by flow 3b. The operating conditions are defined by temperatures on the order of 700 to 950° C. and pressures on the order of 0.05 to 0.5 MPa relative. The input of energy to zone Z1 is provided by the circulation of a solid heat exchanger between the gasification zones and a peripheral zone, not shown in the figures, in which is carried out the combustion of carbon of the unconverted feedstock that corresponds to flow 3b, and optionally a make-up fuel.

The conversion, in zone Z1, of the hydrocarbon feedstock into synthesis gas comprising carbon monoxide and hydrogen is not total. Tars that correspond to more or less alkylated aromatic compounds as well as light hydrocarbons such as methane and ethylene are formed in significant proportions. Synthesis gas 3a that is produced in zone Z1 is therefore subjected in zone Z2 to a more rigorous finishing treatment so as to maximize the conversion of tars and light hydrocarbons into synthesis gas by vapor reforming reactions. An oxidizing agent 4 such as water vapor, alone or mixed with another gas such as carbon dioxide, carbon monoxide, hydrogen or methane can be added as a reagent to zone Z2. A gaseous hydrocarbon feedstock 5 that has a high molar ratio of hydrogen to carbon can also be added so as to improve the $H_2/CO$ ratio at the outlet of zone Z2. The operating conditions in zone Z2 are very rigorous with temperatures typically on the order of 1000 to 1500° C.

The input of energy to the zone can be provided in multiple ways. It is possible to mention, in a non-exhaustive manner, the use of plasma torches, oxygen burners or hydrocarbon burners.

Synthesis gas 6 that is produced at the outlet of finishing zone Z2 undergoes a successive series of treatments. All of these transformation stages are not described in an exhaustive manner in the patent. It is possible to mention, in a non-exhaustive and not necessarily obligatory manner, the reduction of the water content and dust content, the conversion of the synthesis gas so as to adjust the $H_2/CO$ molar ratio that is necessary for the synthesis of liquid fuels, the possible extraction of carbon dioxide.

All of these treatments make it possible to produce a synthesis gas 7 in the required input specifications of the zone for production of liquid fuels Z4. This zone comprises both the units for conversion of synthesis gas into Fisher-Tropsch-type liquid fuels with a catalyst that is placed in a fixed bed or in suspension in a liquid phase (slurry according to English terminology), units for filtration of waxes produced in the process, primary fractionation and units for hydrocracking heavy compounds of $C_{19}^+$ type.

Liquid effluents 8a are then separated in zone Z5, which corresponds to a linking of separating towers comprising at least one debutanizer and a naphtha separation column. The liquid effluents that are produced correspond to a naphtha fraction 11 that is formed primarily from $C_5$–$C_9$-type compounds (i.e., a fraction that is essentially formed by hydrocarbons $C_5$, $C_6$, $C_7$, $C_8$, or $C_9$, comprising 5, 6, 7, 8 or 9 carbon atoms), a kerosene fraction 10 of $C_{10}$–$C_{14}$ type, and a gas oil fraction 9 of $C_{15}$–$C_{19}$ type. Flow 12 corresponds to the gaseous fraction $C_3$–$C_4$ that is produced at the top of the debutanizer.

The aqueous effluents that are produced by the Fischer-Tropsch reaction are evacuated via pipe 8b to a water treatment device, not shown.

Naphtha fraction 11 may be recycled completely or partially in gasification zone Z2. Zone Z6 corresponds to a manifold-type separation zone between a purge stream 13 and a recycling stream 14.

Top gas 15 of Fischer-Tropsch as well as top effluents 12 of the debutanizer of zone Z5 can also be recycled completely or partially in gasification zone Z2. Zone Z7 corresponds to a manifold-type separation zone between a purge stream 16 and a recycling stream 17. Recycled flow 17 is sent into secondary gasification zone Z2. To the extent that the operating conditions are rigorous enough in zone Z1, it is also possible to envisage sending this flow 17 into zone Z1.

In the embodiment of FIG. 1, recycled flow 14 is sent into secondary gasification zone Z2.

Figure 2:
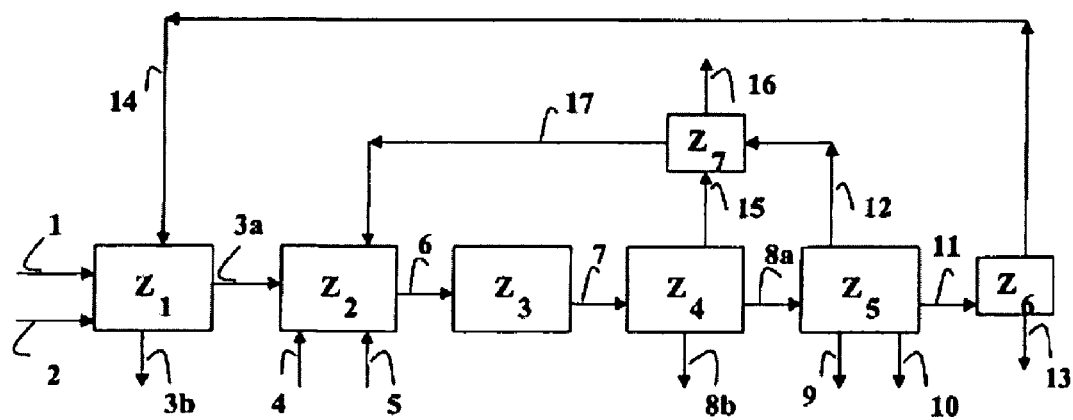

In the embodiment shown in FIG. 2, recycled flow 14 is sent into primary gasification zone Z1.

EXAMPLE 1

This example is based on the computer modeling of a concatenation of processes for conversion of biomass into synthesis gas then conversion of said synthesis gas into liquid fuels according to FIG. 1, with the exception of the recycling of top gas and the recycling of naphtha produced in the separation zone, which are not carried out. In other words, the flow rates of streams 14 and 17 are zero. The modeling was carried out by the Pro II® software marketed by the SIMSCI Company.

Calculations are carried out for an installation that has a 50-ton capacity per hour of dry-base biomass, operating at 0.4 MPa (megapascals). The biomass corresponds to sawdust whose solid particles have a diameter of between 1 and 4 mm and a ratio of length to diameter, L/D, of between 1 and 3. The biomass is introduced in the presence of a conveying gas that corresponds to the combustion fumes that consist of nitrogen and carbon dioxide.

The biomass is introduced into gasification zone Z1 with a relative humidity of 10% by weight in the presence of water vapor that is superheated to 500° C., whereby the initial proportion of water that is introduced is 0.47 kg of water per kg of dry biomass. The outlet temperature of the effluents at the outlet of the primary gasification zone Z1 is 800° C.

The synthesis gas final post-treatment in zone Z2 makes it possible to convert tars and residual methane that are present in the synthesis gas. It is carried out at temperature of 1300° C.

Zone Z3 comprises a compression zone, an adjustment zone so as to adjust the $H_2/CO$ molar ratio to 2.15, and a zone for extraction of $CO_2$ by amine washing.

Zone Z4 comprises a Fischer-Tropsch reactor that operates in the presence of a catalyst in suspension in a liquid phase, a primary fractionation that makes it possible to obtain a top gas and liquid effluents that are sent into a hydrocracking reactor.

Zone Z5 comprises a debutanizer and a column for draw-off of naphtha.

The cumulative production of gas oil and kerosene is 6906 kg/hour, or a yield of 13.8% by weight of dry-base biomass.

Table No. 1 below sums up the various flows of the process concatenation.

TABLE 1

| | Flux on kg/hr | | | | | | | | | |
|---|---|---|---|---|---|---|---|---|---|---|
| | 1 | 2 | 3a | 3b | 4 | 5 | 6 | 7 | 8a | 8b |
| Biomasse sèche | 50000 | | | | | | | | | |
| N2 | 5007 | 0 | 6007 | 0 | 0 | 0 | 5007 | 5056 | 50 | 0 |
| H2 | | 0 | 2622 | | | | 3951 | 4380 | | |
| CO | | 0 | 19639 | | | | 34534 | 28523 | | |
| CO2 | 1879 | 0 | 24895 | | | | 14950 | 2440 | | |
| H2O | | 35523 | 28764 | | | | 27288 | 229 | | 17332 |
| Goudrons | | 0 | 175 | | | | | | | |
| Résidus carbonés | | | | 6698 | | | | | | |
| CH4 | | 0 | 4598 | | | | | | | |
| C2–C4 | | | | | | | | | | |
| C5–C9 | | | | | | | | | 2590 | |
| C10–C14 | | | | | | | | | 2308 | |
| C15–C19 | | | | | | | | | 4600 | |
| TOTAL | 56886 | 35523 | 85701 | 6708 | 0 | 0 | 85700 | 40628 | 9548 | 17332 |

| | Flux on kg/hr | | | | | | | | |
|---|---|---|---|---|---|---|---|---|---|
| | 9 | 10 | 11 | 12 | 13 | 14 | 15 | 16 | 17 |
| Biomass sèche | | | | | | | | | |
| N2 | 0 | 0 | 0 | 50 | 0 | 0 | 5006 | 5056 | 0 |
| H2 | | | | 0 | | | 396 | 396 | 0 |
| CO | | | | 4 | | | 2847 | 2851 | 0 |
| CO2 | | | | 16 | | | 2405 | 2421 | 0 |
| H2O | | | | 12 | | | 97 | 109 | 0 |
| Goudrons | | | | 0 | | | 0 | 0 | 0 |
| Résidus carbonés | | | | | | | | | |
| CH4 | | | | 1 | | | 1150 | 1151 | 0 |
| C2–C4 | | | | 10 | | | 1847 | 1857 | 0 |
| C5–C9 | | | 2590 | | 2590 | 0 | | | |
| C10–C14 | | 2306 | | | | | | | |
| C15–C19 | 4800 | | | | | | | | |
| TOTAL | 4800 | 2306 | 2590 | 93 | 2590 | 0 | 13748 | 13841 | 0 |

[Key to Table 1:]
Flux en kg/hour = Flow in kg/hour
Biomasse sèche = Dry biomass
Goudrons = Tars
Résidus carbonés = Carbon residues The $H_2/CO$ molar ratio is 1.87 at the outlet of zone Z1. The conversion of methane and tars in zone Z2 drops the ratio to the value of 1.60, which necessitates a significant adjustment of the synthesis gas that is produced to bring the $H_2/CO$ molar ratio to 2.15 at the inlet of the Fischer-Tropsch.

EXAMPLE 2

A computer simulation is carried out based on Example 1, with the exception of the top gas that is produced in Fischer-Tropsch section Z4, which is recycled at the inlet of secondary gasification zone Z2 with a purge level of 15% so as to avoid excessive accumulations of nitrogen in the synthesis gas loop. The cumulative production of gas oil and kerosene is 9550 kg/hour, or a yield of 19.1% by weight of dry-base biomass.

Table No. 2 below sums up the various flows of the process concatenation.

the value of 1.70, which reduces the manipulation of the synthesis gas to bring the $H_2/CO$ molar ratio to 2.15 at the inlet of the Fischer-Tropsch synthesis zone.

EXAMPLE 3

According to the Invention

A computer simulation is carried out based on Example 1, with the exception of the top gas that is produced in Fischer-Tropsch section Z4, which is recycled at the inlet of secondary gasification zone Z2. It is the same for the naphtha that is produced in final separation zone Z5 of the liquid fuels. The purge levels are respectively 15% on the top gas and 1% on the naphtha so as to prevent excessive accumulations of undesirable products in the synthesis gas

TABLE 2

| | Flux en kg/hr | | | | | | | | | |
|---|---|---|---|---|---|---|---|---|---|---|
| | 1 | 2 | 3a | 3b | 4 | 5 | 6 | 7 | 8a | 8b |
| Biomasse sèche | 50000 | | | | | | | | | |
| N2 | 5007 | 0 | 5007 | 0 | 0 | 0 | 32175 | 32188 | 130 | 0 |
| H2 | | 0 | 2822 | | | | 5590 | 8057 | | |
| CO | | 0 | 19639 | | | | 45580 | 37442 | | |
| CO2 | 1679 | 0 | 24695 | | | | 18634 | 2691 | | |
| H2O | | 35523 | 28764 | | | | 23172 | 371 | | 24049 |
| Goudrons | | 0 | 176 | | | | | | | |
| Résidus carbonés | | | | 6898 | | | | | | |
| CH4 | | 0 | 4598 | | | | | | | |
| C2–C4 | | | | | | | | | | |
| C5–C9 | | | | | | | | | 3581 | |
| C10–C14 | | | | | | | | | 3189 | |
| C15–C19 | | | | | | | | | 6351 | |
| TOTAL | 56886 | 35523 | 85701 | 6709 | 0 | 0 | 123652 | 80749 | 13251 | 24049 |

| | Flux en kg/hr | | | | | | | | |
|---|---|---|---|---|---|---|---|---|---|
| | 9 | 10 | 11 | 12 | 13 | 14 | 15 | 16 | 17 |
| Biomasse sèche | | | | | | | | | |
| N2 | 0 | 0 | 0 | 130 | 0 | 0 | 32058 | 5019 | 27168 |
| H2 | | | | 0 | | | 548 | 82 | 466 |
| CO | | | | 16 | | | 3930 | 450 | 3349 |
| CO2 | | | | 64 | | | 3328 | 300 | 2829 |
| H2O | | | | 46 | | | 136 | 57 | 1114 |
| Goudrons | | | | 0 | | | 0 | 0 | 0 |
| Résidus carbonés | | | | | | | | | |
| CH4 | | | | 18 | | | 1590 | 245 | 1363 |
| C2–C4 | | | | 300 | | | 1847 | 443.8 | 1871.1 |
| C5–C9 | | | 3581 | | 3581 | 0 | | | |
| C10–C14 | | 3189 | | | | | | | |
| C15–C19 | 6361 | | | | | | | | |
| TOTAL | 6361 | 3189 | 3581 | 574 | 3581 | 0 | 43438 | 6597 | 37851 |

[Key to Table 2:]
Flux en kg/hour = Flow in kg/hour
Biomasse sèche = Dry biomass
Goudrons = Tars
Résidus carbonés = Carbon residues The $H_2/CO$ molar ratio is also 1.87 at the outlet of zone Z1. The recycling of the top gas in zone Z2 makes it possible to limit the reduction of the $H_2/CO$ ratio. This ratio exhibits loop. The cumulative production of gas oil and kerosene is 12,504 kg/hour, or a yield of 25.0% by weight of dry-base biomass.

Table No. 3 below sums up the various flows of the process concatenation.

TABLE 3

| | Flux on kg/hr | | | | | | | | | |
|---|---|---|---|---|---|---|---|---|---|---|
| | 1 | 2 | 3a | 3b | 4 | 5 | 6 | 7 | 8a | 8b |
| Biomasse sèche | 50000 | | | | | | | | | |
| N2 | 5007 | 0 | 5007 | 0 | 0 | 0 | 32175 | 32176 | 0 | 0 |
| H2 | | 0 | 2622 | | | | 7433 | 7931 | | |
| CO | | 0 | 19639 | | | | 58611 | 51643 | | |
| CO2 | 1879 | 0 | 24895 | | | | 17183 | 2613 | | |
| H2O | | 35623 | 28764 | | | | 16091 | 451 | | 30754 |
| Goudrons | | 0 | 175 | | | | | | | |
| Résidus carbonés | | | | 6699 | | | | | | |
| CH4 | | 0 | 4598 | | | | | | | |
| C2–C4 | | | | | | | | | | |
| C5–C9 | | | | | | | | | | 4689 | |
| C10–C14 | | | | | | | | | 4175 | |
| C15–C19 | | | | | | | | | 8329 | |
| TOTAL | 56886 | 35523 | 85701 | 6708 | 0 | 0 | 131495 | 85024 | 17195 | 30754 |

| | Flux on kg/hr | | | | | | | | |
|---|---|---|---|---|---|---|---|---|---|
| | 9 | 10 | 11 | 12 | 13 | 14 | 15 | 16 | 17 |
| Biomasse sèche | | | | | | | | | |
| N2 | 0 | 0 | 0 | 0 | 0 | 0 | 32176 | 5007 | 27169 |
| H2 | | | | 0 | | | 71 | 8107 | 610 |
| CO | | | | 10 | | | 5154 | 450 | 4385 |
| CO2 | | | | 41 | | | 4354 | 300 | 3704 |
| H2O | | | | 31 | | | 176 | 57 | 1455 |
| Goudrons | | | | 0 | | | 0 | 0 | 0 |
| Résidus carbonés | | | | | | | | | |
| CH4 | | | | 10 | | | 2062 | 150 | 1771 |
| C2–C4 | | | | 100 | | | 2418 | 119 | 2057 |
| C5–C9 | | | 4589 | | 47 | 4542 | | | |
| C10–C14 | | 4175 | | | | | | | |
| C15–C19 | 8329 | | | | | | | | |
| TOTAL | 8329 | 4175 | 4599 | 190 | 47 | 4642 | 47077 | 6190 | 41151 |

[Key to Table 3:]
Flux en kg/hour = Flow in kg/hour
Biomasse sèche = Dry biomass
Goudrons = Tars
Résidus carbonés = Carbon residues

The invention claimed is:

1. A process for the production of liquid fuels starting from a solid feedstock containing biomass in which:
 a) the solid feedstock is subjected to a gasification stage so as to convert said feedstock into synthesis gas comprising carbon monoxide and hydrogen,
 b) the synthesis gas that is obtained in stage a) is subjected to a purification treatment that comprises an adjustment to increase the molar ratio of hydrogen to carbon monoxide, $H_2/CO$, up to a predetermined value,
 c) the purified synthesis gas that is obtained in stage b) is subjected to a conversion stage that comprises the implementation of a Fischer-Tropsch-type synthesis so as to convert said synthesis gas into a liquid effluent and a gaseous effluent,
 d) the liquid effluent that is obtained in stage c) is fractionated so as to obtain at least two fractions that are selected from the group that consists of: a gaseous fraction, a naphtha fraction, a kerosene fraction and a gas oil fraction, and
 e) at least a portion of any naphtha fraction obtained in step d) is recycled in gasification stage a).

2. A process according to claim 1, in which the predetermined value of stage b) is between 1.8 and 2.2.

3. A process according to claim 1, in which gasification stage a) is implemented in at least one zone in which the temperature is kept above 1000° C.

4. A process according to claim 1, in which during gasification stage a),
 the soild feedstock is brought into contact with an oxidizing agent under pyrolysis conditions to produce a first gaseous effluent in a primary zone in which the solid feedstock is kept in the fluidized state and the oxidizing gas content is kept below 10 mol %, and
 the gaseous effluent that is thus produced is subjected to a finishing treatment in a secondary zone in which the temperature is kept between 1000 and 1500° C.

5. A process according to claim 4, comprising supplying energy into the primary zone by circulation of solid heat exchange particles.

6. A process according to claim 5, in which the solid heat exchange particles comprises a silica alumina that exhibits an acidic nature.

7. A process according to claim 1, in which the solid feedstock is injected in the gasification stage by means of a carrier gas that does not contain nitrogen.

8. A process according to claim 1, in which the purification treatment of stage b) also comprises at least one treatment selected from a reduction of the water content, a reduction of the dust content, an extraction of carbon dioxide and a compression of synthesis gas.

9. A process according to claim 1, in which stage c) that comprises the implementation of a Fischer-Tropsch-type synthesis also comprises a stage for filtration of waxes produced by said Fischer-Tropsch-type synthesis, a fractionation stage so as to recover a fraction of hydrocarbon compounds having at least 19 carbon atoms and a hydrocracking stage of said compounds.

10. A process according to claim 1, in which at least a portion of the gaseous effluent obtained in stage c) and a gaseous fraction obtained in stage d) are recycled to gasification stage a).

11. A process according to claim 1, in which a portion of the gaseous effluent obtained in stage c) and a gaseous fraction obtained in stage d) are purged.

12. A process according to claim 4, in which a naphtha fraction is obtained in step d) and at least a portion of the naphtha fraction is recycled in the primary zone of stage a).

13. A process according to claim 4, in which a naphtha fraction is obtained in step d) and at least a portion of the naphtha fraction from step d) is recycled in the secondary zone of stage a).

14. A process according to claim 2, in which gasification stage a) is implemented in at least one zone in which the temperature is kept above 1000° C.

15. A process according to claim 2, in which during gasification stage a),
the feedstock is brought into contact with an oxidizing agent under pyrolysis conditions to produce a first gaseous effluent in a primary zone in which the solid feedstock is kept in the fluidized state and the oxidizing gas content is kept below 10 mol %, and the gaseous effluent that is this produced is subjected to a finishing treatment in a secondary zone in which the temperature is kept between 1000 and 1500° C.

16. A process according to claim 14, in which during gasification stage a),
the feedstock is brought into contact with an oxidizing agent under pyrolysis conditions to produce a first gaseous effluent in a primary zone in which the solid feedstock is kept in the fluidized state and the oxidizing gas content is kept below 10 mol %, and the gaseous effluent that is thus produced is subjected to a finishing treatment in a secondary zone in which the temperature is kept between 1000 and 1500° C.

17. A process according to claim 1, wherein said at least two fractions comprise at least one of said kerosene fraction and said gas oil fraction.

18. A process according to claim 17, wherein said at least two fractions comprise both said kerosene fraction and said gas oil fraction.

19. A process according to claim 1, wherein said solid feedstock is sawdust.

20. A process according to claim 1 in which a naphtha fraction is obtained in step (d) and at least a portion of the naphtha fraction from step (b) is recycled to the gasification stage of step (a).

* * * * *

UNITED STATES PATENT AND TRADEMARK OFFICE
CERTIFICATE OF CORRECTION

PATENT NO. : 7,214,720 B2  Page 1 of 1
APPLICATION NO. : 10/971711
DATED : May 8, 2007
INVENTOR(S) : Jerome Bayle It is certified that error appears in the above-identified patent and that said Letters Patent is hereby corrected as shown below:

Column 14, line 4 reads "this". Should read --thus--.

Signed and Sealed this

Seventh Day of August, 2007

JON W. DUDAS
*Director of the United States Patent and Trademark Office*